Patented Aug. 25, 1936

2,052,411

UNITED STATES PATENT OFFICE 2,052,411

PRODUCTION OF RUBBER DERIVATIVES

Stewart S. Kurtz, Jr., Merion, Pa., assignor, by mesne assignments, to Wingfoot Corporation, Wilmington, Del., a corporation of Delaware No Drawing. Application July 18, 1933, Serial No. 680,982

7 Claims. (Cl. 260—1)

This invention relates to improvements in the production of rubber derivatives.

By treating a rubber cement, i. e. a solution of rubber in an organic solvent such as benzene, carbon tetrachloride, etc., with certain chemical reagents such as the halides of amphoteric metals, for example stannic chloride, ferric chloride, etc., and compounds such as chlor stannic acid or a mixture of hydrochloric acid and compounds such as stannic chloride metallic derivatives of rubber are formed. If the metallic derivative is then treated with alcohol, acetone, or water, the metal is split off and a condensation derivative of rubber is obtained. If the metallic derivative is treated with alcohol or acetone, the benzene or other organic solvent of the cement dissolves in the alcohol or acetone. If, however, the metallic derivative is treated with water an emulsion is produced.

According to this invention, sufficient water is employed to produce an emulsion in which the water forms the continuous phase and the solution of the rubber derivative in the organic solvent forms the discontinuous phase. If a small amount of water is used, the rubber derivative forms the continuous phase and water soluble impurities present, such as inorganic salts, etc. can be removed only with great difficulty. If, however, a large amount of water is used and the water is vigorously agitated while the solution of the rubber derivative is added to it as contemplated by this invention, the solution of the rubber derivative in the organic solvent becomes dispersed throughout the water in the form of fine droplets. With this type of emulsion water soluble impurities may readily be separated from the rubber derivative. By dispersing the solution of the metallic addition compound of the rubber in this manner in a large amount of water and then with continuous agitation, boiling the resulting emulsion or subjecting it to steam distillation to volatilize the benzene or other organic solvent, the rubber condensation derivative is obtained in the form of finely sub-divided particles of relatively high purity. These particles can then readily be separated from the water by filtration or centrifuging or other suitable means and the particles can be dried, if desirable.

The composition of the rubber condensation derivative obtained will depend upon the reagent employed. If chlor stannic acid is used, the condensation derivative contains chlorine and appears to be a hydrogen chloride addition product of the derivative obtained when tin tetrachloride or ferric chloride is used. In either event the rubber derivative obtained has a $(C_5H_8)x$ structure in which more carbon atoms are directly connected than in rubber, since these derivatives are less unsaturated than rubber.

The invention will be further described by the following example but it is intended and it is to be understood that the invention is not limited thereto.

Dilute 1340 grams of a rubber cement containing 20% of rubber, with 1000 cc. of anhydrous benzene. During this process, a portion of the latter material is employed as a vehicle for the introduction of thin pine tar, equivalent in weight to 5.3% of the rubber in the cement. A 5.0 cc. portion of anhydrous tin tetrachloride, equivalent in weight to approximately 4.25% of the rubber is then mixed with 200 cc. of benzene and added to the diluted cement. The mixture is stirred at room temperature for a period of 25 minutes, the vessel containing it is then immersed in a water bath heated to a temperature of approximately 45° C., and the temperature is gradually increased to approximately 90° C. during a period of about 25 minutes. The solution is maintained at the latter temperature for two hours, at the end of which time the product obtained is poured into warm water, stirred vigorously and boiled for an additional period of about 14 minutes, in order to remove any rubber solvents and to hydrolyze the tin chloride, and thus render it inactive. Sufficient water, for example 5 to 10 volumes, is employed to produce an emulsion in which the water forms the continuous phase and the solution of the reaction product in benzene forms the discontinuous phase.

On removal of the solvent the condensation derivative is precipitated as a fine, sand-like material which is boiled to remove any solvents and unreacted tin chloride that may be remaining therein, and is finally dried. The dried product is a gray, fluffy granular material.

Using less tin chloride, for example 3.9% of the weight of the rubber, a softer product is obtained. More or less of the reagent is used depending upon the nature of the product desired.

Pine tar is added to the benzene solution to reduce the sensitivity of the tin chloride reaction and is not essential to the reaction.

Instead of boiling the emulsion to remove the solvent, other means such as steam distillation may be employed.

Instead of using tin tetra chloride, other compounds such as ferric chloride, aluminum chloride, antimony chloride, chromic chloride, etc.

may be employed or the rubber may be reacted with a compound such as chlorostannic acid or other compound which forms a metal derivative which is decomposed on being added to water.

This application is in part a continuation of my application Serial No. 273,321, filed April 27, 1928.

It is intended that the patent shall cover, by suitable expression in the appended claims, whatever features of patentable novelty reside in the invention.

What I claim is:

1. The method which comprises reacting rubber with the chloride of an amphoteric metal and pouring a solution of the reaction product in an organic solvent with vigorous agitation into sufficient water to form an emulsion in which the water forms the continuous phase and the solution of the rubber derivative in the organic solvent forms the discontinuous phase.

2. The method of forming a rubber derivative which comprises reacting rubber with stannic chloride, adding a solution of the reaction product in an organic solvent to sufficient water to form an emulsion in which the water forms the continuous phase and the solution of the rubber derivative forms the discontinuous phase, while vigorously agitating the water.

3. The method of producing a rubber derivative which comprises reacting rubber with chlor stannic acid in a solution of an organic solvent, adding the solution of the reaction product to sufficient water to form an emulsion in which the water forms the continuous phase and the solution of the rubber derivative forms the discontinuous phase, while vigorously agitating the water.

4. The method of forming a rubber derivative which comprises reacting rubber with stannic chloride, adding a solution of the reaction product in an organic solvent to sufficient water to form an emulsion in which the water forms the continuous phase and the solution of the rubber derivative forms the discontinuous phase, and then volatilizing the solvent with sufficient agitation to maintain such an emulsion.

5. The method of forming a rubber derivative which comprises reacting rubber with chlorostannic acid, adding a solution of the reaction product in an organic solvent to sufficient water to form an emulsion in which the water forms the continuous phase and the solution of the rubber derivative forms the discontinuous phase, and then volatilizing the solvent with sufficient agitation to maintain such an emulsion.

6. In the process of preparing condensation derivatives of rubber which are decomposition products produced by the addition of water to metallic addition products of rubber, the steps which comprise decomposing by water said addition products while in solution in solvent immiscible with water and forming an aqueous emulsion in which the solution of the decomposition product in the solvent forms the discontinuous phase and volatilizing solvent from the solution while thus emulsified.

7. In the process of producing condensation derivatives of rubber by the process which involves treating the rubber with a reagent which forms therewith an addition compound which is decomposable by water into the condensation derivative and water-soluble impurities, the improvement which comprises decomposing with water a solution of the addition compound in a solvent immiscible with water and then volatilizing the solvent from the resulting solution of the condensation derivative while suspended as droplets in the aqueous solution of the impurities.

STEWART S. KURTZ, Jr.